US007768489B2

(12) United States Patent
Liu et al.

(10) Patent No.: US 7,768,489 B2
(45) Date of Patent: Aug. 3, 2010

(54) METHOD FOR DRIVING A LIQUID CRYSTAL DISPLAY

(75) Inventors: Pin-Miao Liu, Taipei County (TW); Cheng-Han Tsao, Taipei County (TW); Po-Lun Chen, Chiayi (TW)

(73) Assignee: Au Optronics Corp., Hsinchu (TW)

( * ) Notice: Subject to any disclaimer, the term of this patent is extended or adjusted under 35 U.S.C. 154(b) by 554 days.

(21) Appl. No.: 11/555,702

(22) Filed: Nov. 2, 2006

(65) Prior Publication Data

US 2007/0290970 A1 Dec. 20, 2007

(30) Foreign Application Priority Data

Jun. 14, 2006 (TW) .............................. 95121172 A

(51) Int. Cl.
*G09G 3/36* (2006.01)
*G06F 3/038* (2006.01)

(52) U.S. Cl. ............................ 345/94; 345/84; 345/87; 345/204; 345/208

(58) Field of Classification Search ................... 345/55, 345/76, 79, 84, 87, 88, 90, 92, 94, 95, 96, 345/98, 100, 204, 205, 208, 209, 210, 211, 345/212, 213, 214, 690; 315/160, 167, 169.1, 315/169.2
See application file for complete search history.

(56) References Cited

U.S. PATENT DOCUMENTS 5,398,043 A * 3/1995 Takeda et al. ................. 345/94
6,570,549 B2 5/2003 Nakanishi et al.
6,771,245 B2 * 8/2004 Kanbe et al. .................. 345/94
7,123,225 B2 * 10/2006 Chen ........................... 345/89
7,173,591 B2 * 2/2007 Monomohshi ............... 345/96
2008/0111767 A1 * 5/2008 Liu et al. ...................... 345/58

* cited by examiner

*Primary Examiner*—My-Chau T Tran
(74) *Attorney, Agent, or Firm*—Thomas, Kayden, Horstemeyer & Risley

(57) ABSTRACT

A method for driving a normal black type liquid crystal display (LCD) includes driving the LCD by applying uncompensated source signals corresponding to gray levels; recording first optimized common signal voltages (Vcom-opt1) of common signals corresponding with the gray levels; adjusting the source signal to drive the LCD so second optimized common signal voltages (Vcom-opt2) of common signals corresponding with the gray levels conform to the following conditions: (1) when the gray level is lower than a predetermined gray level, the Vcom-opt2 exceeds a predetermined voltage of the common signal and the absolute difference between the Vcom-opt2 and the predetermined voltage is less than or equal to that between the Vcom-opt1 and the predetermined voltage; and (2) when the gray level exceeds the predetermined gray level, the absolute difference between the Vcom-opt2 and the predetermined voltage is less than or equal to that between the Vcom-opt1 and the predetermined voltage.

8 Claims, 10 Drawing Sheets

METHOD FOR DRIVING A LIQUID CRYSTAL DISPLAY

BACKGROUND OF THE INVENTION

1. Field of the Invention

The invention relates to a liquid crystal display, and more particularly, to a method for eliminating image sticking in an LCD.

2. Description of the Related Art

FIG. 1 is a schematic diagram of a pixel and a driving circuit of a panel. The panel comprises a liquid crystal layer 11 disposed between a pixel electrode A (not shown) formed on a first substrate and a counter electrode (not shown) formed on a second substrate. A thin film transistor (TFT) 12 is disposed on the first substrate. A gate G of TFT 12 is electrically coupled to a gate line of the first substrate and a source S of TFT 12 is electrically coupled to a source line of the first substrate. Pixel electrode A is coupled to a drain D of TFT 12. Counter electrode B is coupled to a common signal source providing a common signal $V_C$.

The source line is coupled to a source signal source providing various source signals Vd for adjusting the voltage level of pixel electrode A and changing a first voltage difference between pixel electrode A and counter electrode B. Thus, the arrangement of molecules in liquid crystal layer 11 is adjusted for controlling the gray levels of liquid crystal layer 11. If the panel is a normal black type, the brightness of a pixel is brighter as the first voltage difference is higher. On the other hand, if the panel is a normal white type, the pixel is less bright as the first voltage difference is higher.

FIG. 2A shows a conventional waveform of a signal to be applied to the panel shown in FIG. 1. In the conventional method, the source signal source provides various source signals Vd according to various gray levels. A symbol Vd-center represents middle-voltages of the source signals Vd. In this embodiment, the panel is a normal white type. Common signal Vc comprises a fixed middle-voltage $V_{COM}$. In various gray levels Ln ($0 \leqq n \leqq 255$), the source signal source provides voltage levels Vcdc+V(n) and Vcdc−V(n) such that the first voltage difference between pixel electrode A and counter electrode B is V(n), where n is a gray level, V(n) is an amplitude of an analog voltage for generating the gray level of the panel, and voltage level Vcdc is a constant value. In an ideal state the voltage difference Vds between the source S and the drain D is equal to zero and capacitances of all capacitors are infinite. Besides, the middle-voltage $V_{COM}$ is equal to voltage level Vcdc (Vd-center), and a voltage received by pixel electrode A is equal to source signal Vd. In practice, due to effects upon voltage difference Vds between the source S and the drain D and stray capacitors, the source signal Vd is compensated such that the voltage received by pixel electrode A is equal to the source signal Vd shown in FIG. 2A.

The voltage received by pixel electrode A is a shift result of the source signal Vd, generated by the voltage difference Vds, a stray capacitor Cgd and the gate voltage Vg (FIG. 1), and a feed-through voltage Vfh. The feed-through voltage Vfh is expressed by the following equation (1):

$$Vfh = \frac{Cgd}{Clc + Cs + Cgd}(Vgh - Vgl) \qquad \text{Equation (1)}$$

where Vgh is a high level of the gate voltage Vg, and Vgl is a low level of the gate voltage Vg. The difference between Vgh and Vgl is constant.

Because the voltage received by pixel electrode A changes according to the source signal Vd changed by the source signal source, the capacitance of a capacitor Clc also changes according to the voltage (analog voltage) received by pixel electrode A. FIG. 2B shows a relationship between the source signal Vd (the analog voltage of pixel electrode A) and the capacitance of a capacitor Clc. When the level of the source signal Vd increases, the capacitance of the capacitor Clc does, as well. Thus, the capacitance of the capacitor Clc depends on the level of the analog voltage of pixel electrode A. When the level of the source signal Vd is higher, the analog voltage of pixel electrode A is also higher. Thus, the analog voltage of pixel electrode A depends on the level of the source signal Vd.

FIG. 2C shows a relationship between the source signal Vd and the feed-through voltage Vfh. When the level of the source signal Vd is higher, the level of the feed-through voltage Vfh is lower.

FIG. 2D is a schematic diagram of another conventional method for driving the panel shown in FIG. 1. The conventional method adjusts source signal Vd corresponding to different gray levels such that the middle-voltage thereof is not constant. In this example, the panel shown in FIG. 1 is a normal white type and the common signal Vc comprises a constant middle-voltage $V_{COM}$. When the liquid crystal layer 11 displays various gray levels, pixel electrode A requires various voltage levels. Thus, the feed-through voltages Vfh are different. In order that pixel electrode A receives the analog voltage ±V(n) shown in FIG. 2A, when the liquid crystal layer 11 displays the gray level Ln, the source signal Vd provides voltage levels Vcenter(n)+V(n) and Vcenter−V(n) to pixel electrode A such that the first voltage difference between pixel electrode A and the counter electrode B is V(n), where Vcenter(n)−Vfh(n)=$V_{COM}$. Thus, Vcenter(n)=$V_{COM}$+Vfh(n). Vfh(n) represents a voltage difference between Vcenter(n) and $V_{COM}$, where Vcenter(n) is obtained according to the voltage difference Vds.

FIG. 3A shows a relationship between the gray level and the voltage received by pixel electrode A where source signal Vd shown in FIG. 2A is applied in the circuit shown in FIG. 1. FIG. 3B shows a relationship between the gray level and the voltage received by pixel electrode A where source signal Vd shown in FIG. 2D is applied in the circuit shown in FIG. 1. The middle-voltage received by pixel electrode A is equivalent to $V_{COM}$ and causes the analog voltage corresponding to gray level and the common signal Vc received by counter electrode B to operate normally. Since source signal Vd is provided from the first substrate, when source signal Vd is compensated, a voltage difference is generated between the DC component of the compensated source signal Vd and that of a fixed voltage received by the counter electrode B of the second substrate. For a long time, a unidirectional deviation is formed in the liquid crystal layer 11 such that an electrical field is generated. It is difficult to remove such electrical field, and thus an image sticking issue arises in the panel resulting in image distortion.

U.S. Pat. No. 6,570,549 (the '549 patent) discloses a method of driving an LCD to address the image sticking issue. FIG. 3C shows a relationship between the gray level and the voltage received by pixel electrode A where source signal Vd disclosed in the '549 patent is applied in the circuit shown in FIG. 1. When the brightness of the panel is darker (the voltage level of the source signal Vd is lower), the method of the '549 patent causes the middle-voltage received by pixel electrode A to exceed $V_{COM}$ such that the unidirectional deviation in the liquid crystal layer is removed for ameliorating the image sticking issue.

The '549 patent, however, does not specify that a middle-voltage received by pixel electrode A in a specific gray range is necessary to compensate and does not define a compensation range.

BRIEF SUMMARY OF THE INVENTION

A method for driving a normal black or white liquid crystal display (LCD) is provided. The LCD comprises a liquid crystal layer, a thin film transistor (TFT), a pixel electrode, and a counter electrode. The TFT comprises a source receiving a source signal and a drain coupled to the pixel electrode. The counter electrode receives a common signal. When a voltage level of the source signal is higher, the brightness of the LCD is brighter. The LCD is applied with a preset common voltage.

An exemplary embodiment of a method according to the present invention drives a normal black liquid crystal display. The LCD is driven by applying uncompensated source signals corresponding to gray levels. First optimized voltages of common signals corresponding to the gray levels are recorded. The source signal is adjusted to drive the LCD such that second optimized common signal voltages of common signals corresponding to the gray levels conform to the following conditions: (1) when the gray level is lower than a predetermined gray level, the second optimized common signal voltage is higher than a predetermined voltage of the common signal and the absolute difference between the second optimized common signal voltage and the predetermined voltage is less than or equal to that between the first optimized common signal voltage and the predetermined voltage and (2) when the gray level is not lower than the predetermined gray level, the absolute difference between the second optimized common signal voltage and the predetermined voltage is less than or equal to that between the first optimized common signal voltage and the predetermined voltage. Preferably, when the LCD typically displays dynamic images and an interlacing method is utilized for providing various gray levels, if the gray level is not lower than the predetermined gray level, the second optimized common signal voltage is interlaced to higher and lower than the predetermined voltage of the common signal in any eight neighboring gray levels. In other words, the second optimized common signal voltages of common signals corresponding to the gray levels are described in the following. In a first group comprising eight gray levels, the second optimized common signal voltage is higher (or lower) than the predetermined voltage of the common signal and in a second group neighboring the first group and comprising eight gray levels, the second optimized common signal voltage is lower (or higher) than the predetermined voltage of the common signal for reducing the image sticking in dynamic images.

Another exemplary embodiment of a method according to the present invention drives the normal white type liquid crystal display, in which brightness of the LCD is reduced when the voltage of a source signal is increased. The LCD is driven by applying uncompensated source signals corresponding to gray levels. First optimized common signal voltages (Vcom-opt1) of common signals corresponding to the gray levels are recorded. The source signal is adjusted to drive the LCD such that second optimized common signal voltages (Vcom-opt2) of common signals corresponding to the gray levels conform to the following conditions: (1) when the gray level is lower than a predetermined gray level, the second optimized common signal voltage is lower than a predetermined voltage of the common signal and the absolute difference between the second optimized common signal voltage and the predetermined voltage is less than or equal to that between the first optimized common signal voltage and the predetermined voltage, and (2) when the gray level is not lower than the predetermined gray level, the absolute difference between the second optimized common signal voltage and the predetermined voltage is less than or equal to that between the first optimized common signal voltage and the predetermined voltage. Preferably, when the LCD typically displays dynamic images and an interlacing method is utilized for providing various gray levels, if the gray level is not lower than the predetermined gray level, the second optimized common signal voltage is interlaced to higher or lower than the predetermined voltage of the common signal in any eight neighboring gray levels. The second optimized common signal voltages of common signals corresponding to the gray levels are described in the following. In a first group comprising eight gray levels, the second optimized common signal voltage is higher (or lower) than the predetermined voltage of the common signal and in a second group neighboring the first group and comprising eight gray levels, the second optimized common signal voltage is lower (or higher) than the predetermined voltage of the common signal for reducing image sticking in dynamic images.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is determined by reference to the appended claims.

Figure 1:
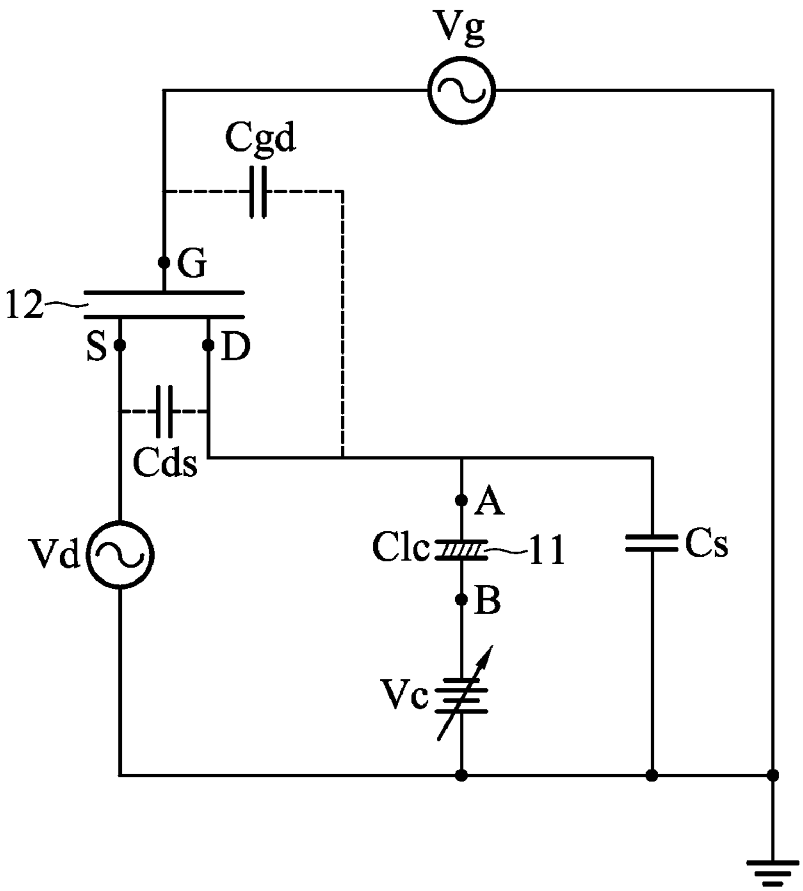
FIG. 1 ( PRIOR ART )
FIG. 1 is a schematic diagram of a pixel and a driving circuit of a panel.
Figure 4A:
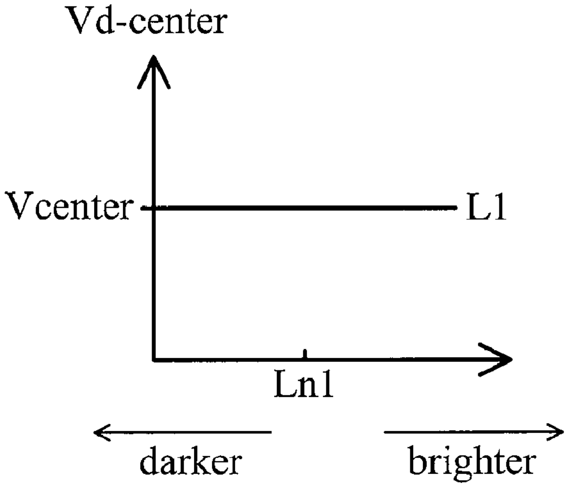
FIG. 4A shows a relationship curve L1 between the middle-voltage Vd_center of the source signal Vd and the gray levels (various source signals) when the source signal Vd is uncompensated.
Figure 4B:
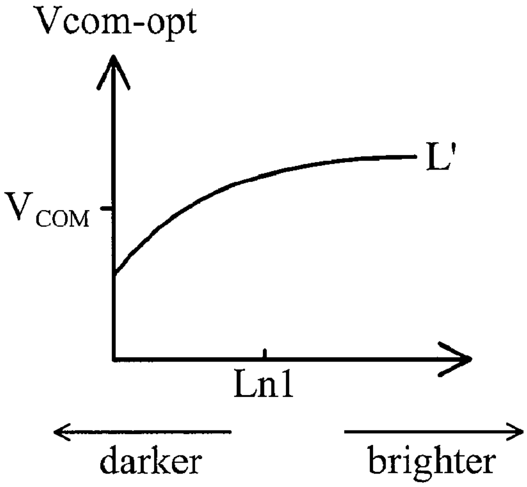
FIG. 4B shows a relationship curve L'1 circuit between an optimized common signal voltage Vcom-opt and gray levels (various source signals) when the LCD shown in FIG. 1 is driven by the uncompensated source signal Vd.

The invention provides a method for driving an LCD according to the layouts of a driving circuit, materials of a liquid crystal layer, changes of the leading axle of the liquid crystal and characteristics of positive or negative ions. The method for driving an LCD, according to the present invention, can be implemented for reducing image sticking. Taking the LCD shown in FIG. 1 and FIGS. 4A to 4F as an example, the operating principle of the method for driving an LCD is described in the following FIG. 4A shows a relationship curve L1 between the middle-voltage Vd_center of the source signal Vd and the gray levels (various source signals) when the source signal Vd is uncompensated (e.g., the middle-voltage of the source signal Vd is kept constant). FIG. 4B shows a relationship curve L'1 circuit between an optimized common signal voltage Vcom-opt and gray levels (various source signals) when the LCD shown in FIG. 1 is driven by the uncompensated source signal Vd (e.g., the middle-voltage of the source signal Vd is kept constant). As shown in FIG. 4A, the middle-voltage Vd_center is held and equal to voltage Vcenter when the brightness of the pixel or gray level of the liquid crystal layer 11 exceeds a preset value $Ln_1$. As shown in FIG. 4B, when the brightness of the pixel or gray level of the liquid crystal layer 11 is increased, the optimized common signal voltage Vcom-opt is also increased. The optimized common signal voltage Vcom-opt is not equal to a predetermined voltage $V_{COM}$ set for the LCD.

Figure 2A:
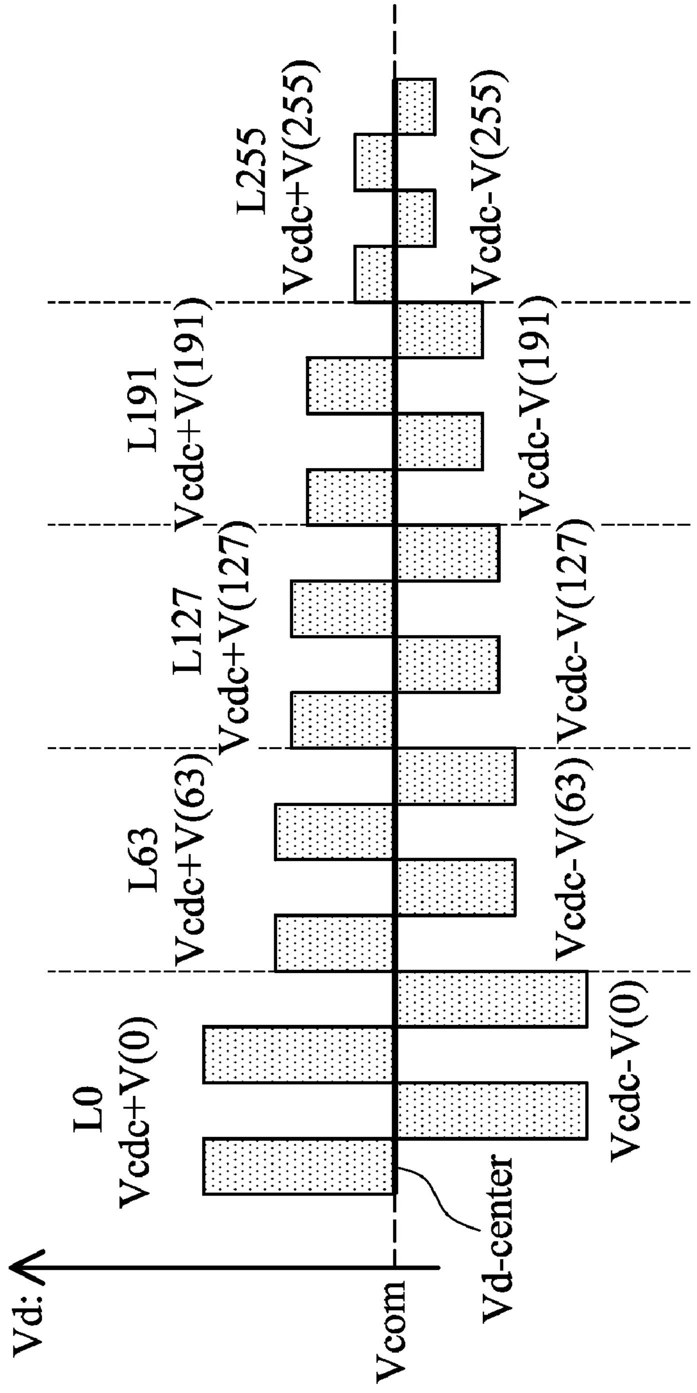
FIG. 2A ( PRIOR ART )
FIG. 2A shows a conventional waveform of a signal to be applied to the panel shown in FIG. 1.
Figure 2B:
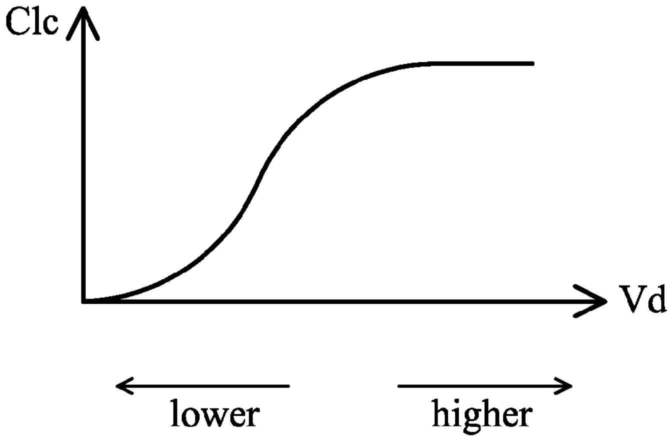
FIG. 2B ( PRIOR ART )
FIG. 2B shows a relationship between the source signal Vd (the analog voltage of pixel electrode A) and the capacitance of a capacitor Clc.
Figure 2C:
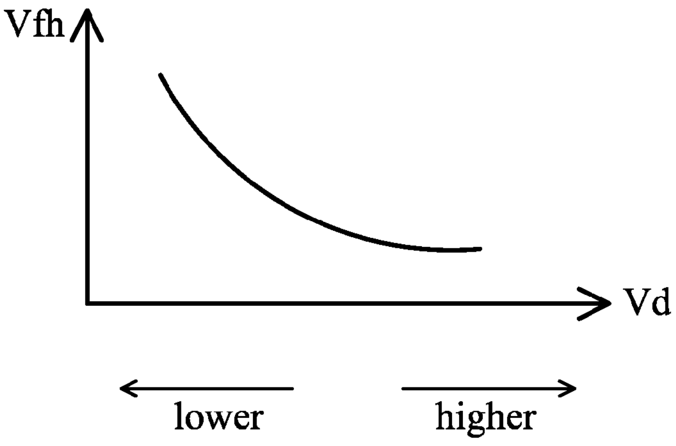
FIG. 2C ( PRIOR ART )
FIG. 2C shows a relationship between the source signal Vd and the feed-through voltage Vfh.
Figure 2D:
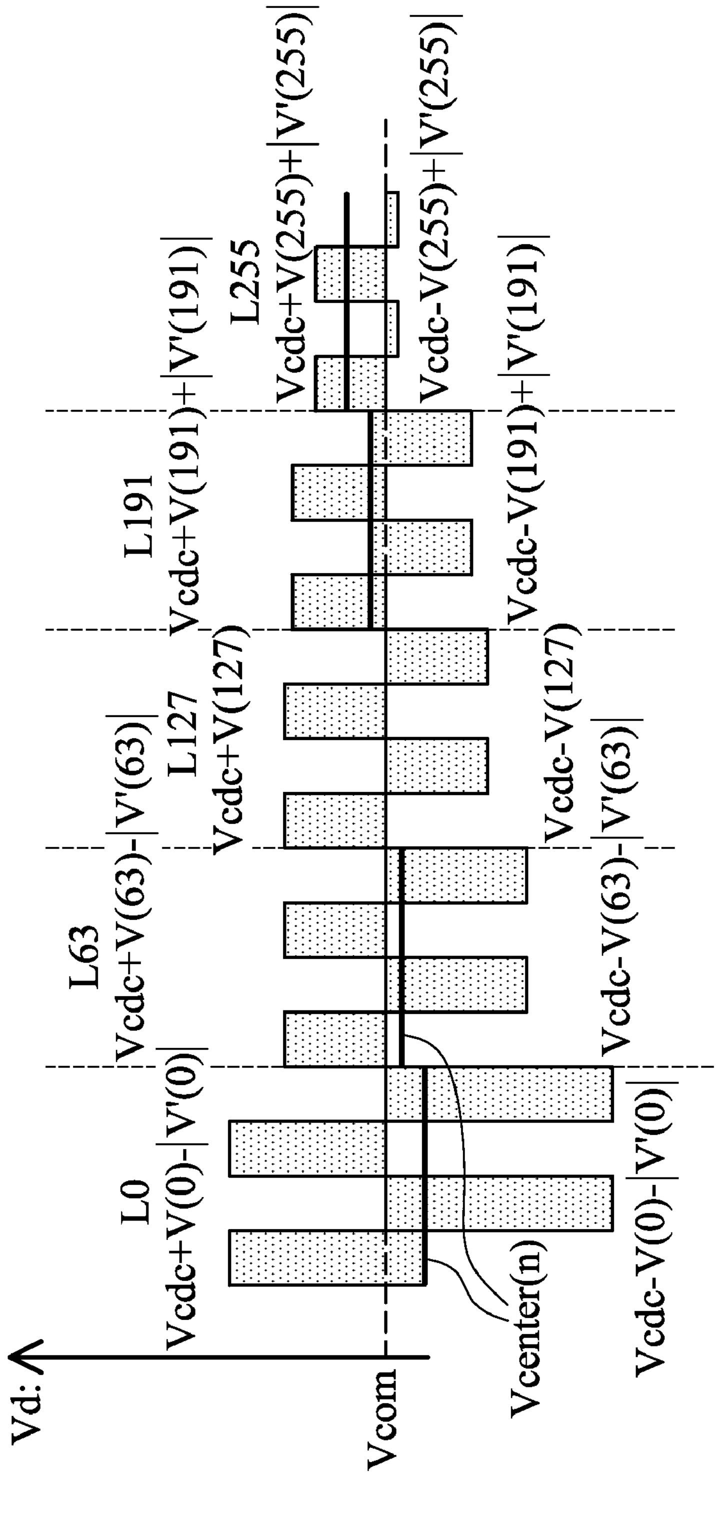
FIG. 2D (PRIOR ART)
FIG. 2D is a schematic diagram of another conventional method for driving the panel shown in FIG. 1.
Figure 3A:
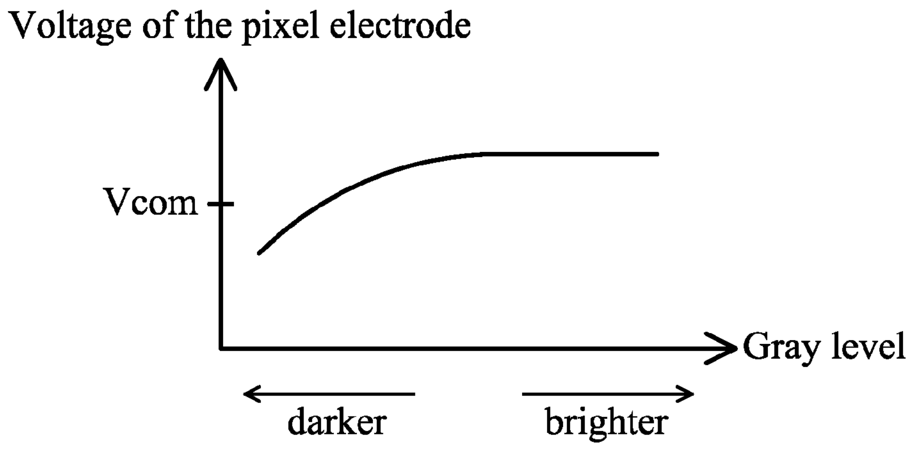
FIG. 3A ( PRIOR ART )
FIG. 3A shows a relationship between the gray level and the voltage received by pixel electrode A when source signal Vd shown in FIG. 2A is applied in the circuit shown in FIG. 1.
Figure 3B:
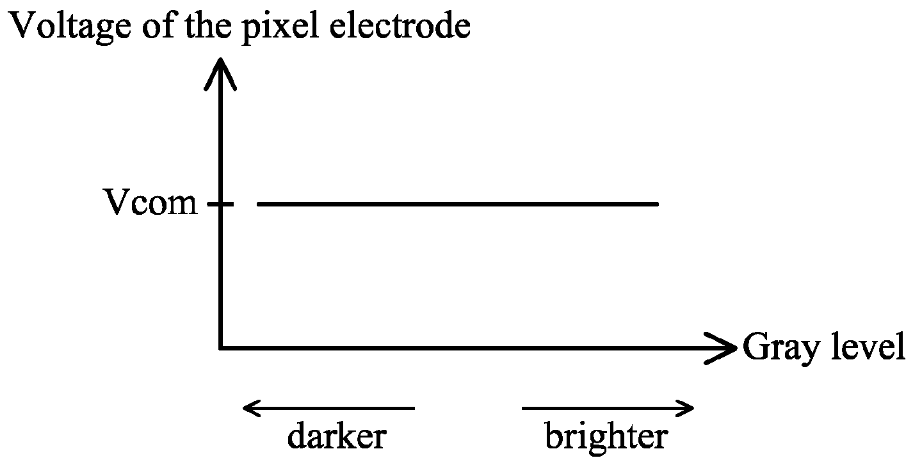
FIG. 3B ( PRIOR ART )
FIG. 3B shows a relationship between the gray level and the voltage received by pixel electrode A when source signal Vd shown in FIG. 2D is applied in the circuit shown in FIG. 1.
Figure 3C:
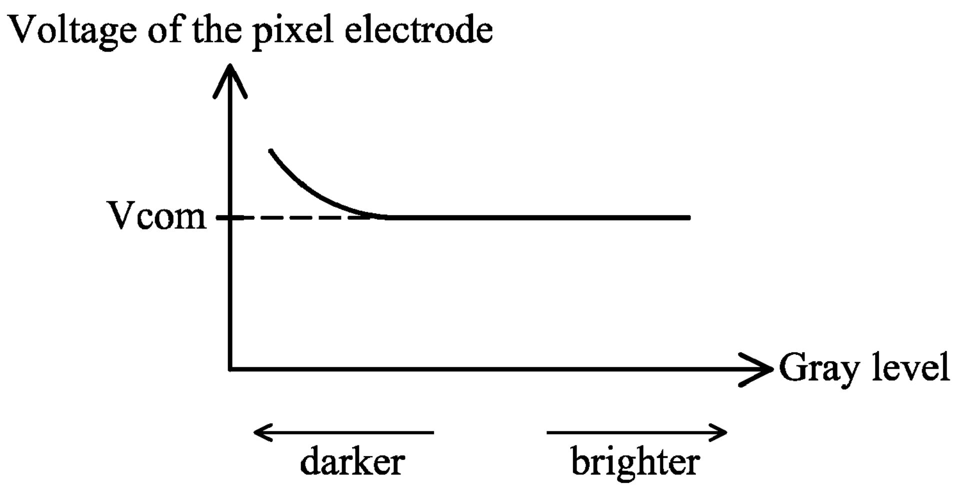
FIG. 3C ( PRIOR ART )
FIG. 3C shows a relationship between the gray level and the voltage received by pixel electrode A where source signal Vd disclosed in the '549 patent is applied in the circuit shown in FIG. 1.
Figure 4C:
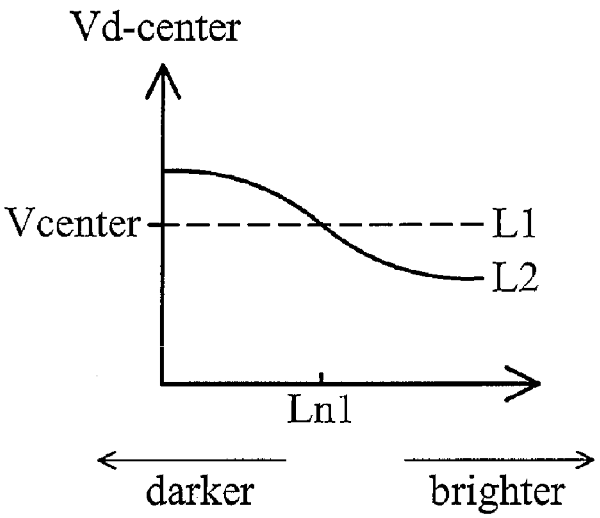
FIG. 4C shows a relationship curve L2 between the middle-voltage Vd_center of the source signal Vd and the gray levels (various source signals) when the source signal Vd is compensated.
Figure 4D:
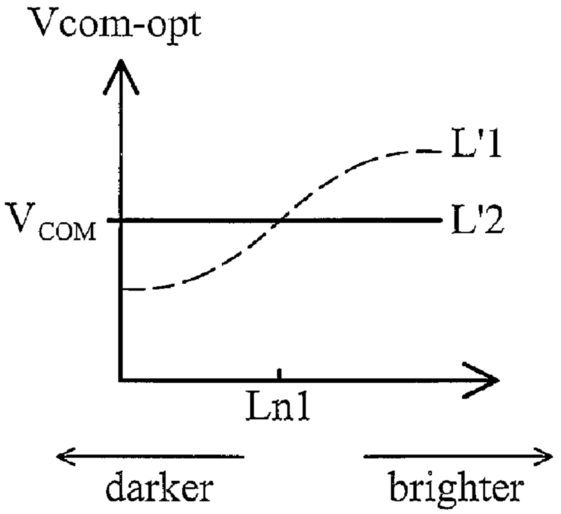
FIG. 4D shows a relationship curve L'2 between an optimized common signal voltage Vcom-opt and gray levels (various source signals) when the LCD shown in FIG. 1 is driven by the compensated source signal Vd.

FIG. 4C shows a relationship curve L2 between the middle-voltage Vd_center of the source signal Vd and the gray levels (various source signals) when the source signal Vd is compensated (e.g., the middle-voltage of the source signal Vd is not constant). FIG. 4D shows a relationship curve L'2 between an optimized common signal voltage Vcom-opt and gray levels (of various signals) when the LCD shown in FIG. 1 is driven by the compensated source signal Vd. For example, the source signal Vd is compensated utilizing the conventional method shown in FIG. 2D. The curve L'2 shows a relationship between the predetermined voltage $V_{COM}$ set for the LCD and various gray levels.

Figure 4E:
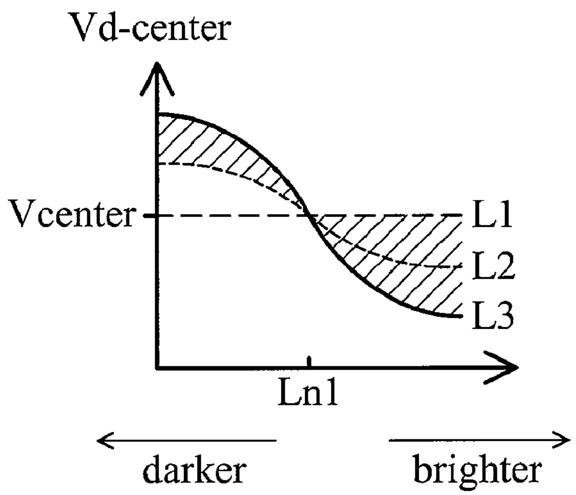
FIGS. 4E to 4H are schematic diagrams of an exemplary embodiment of the method for driving an LCD, according to the present invention.
Figure 4F:
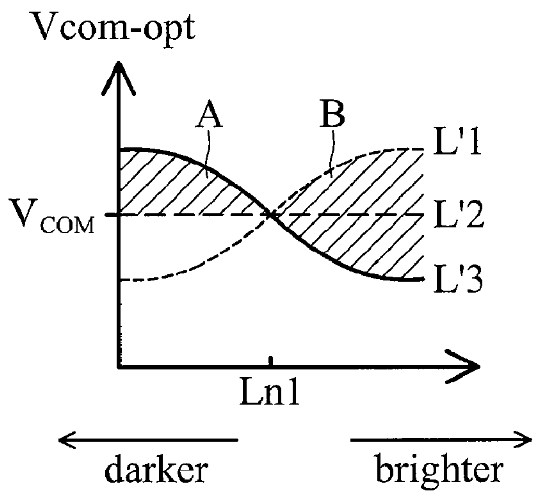

FIGS. 4E and 4F are schematic diagrams of an exemplary embodiment of the method for driving an LCD. The curve L'3 shown in FIG. 4F is generated according to the curves L'1 and L'2 shown in FIG. 4D. The curve L'3 is a mirror curve of the curve L'1 with respect to the curve L'2. In any one gray level, the voltage difference between curves L'3 and L'2 is equal to that between curves L'1 and L'2. When the brightness or the gray level exceeds the preset value $Ln_1$, the voltage of the curve L'1 exceeds the predetermined voltage $V_{COM}$ of the curve L'2 and the voltage of the curve L'3 is less than that of the curve L'2.

According to the present invention, the voltages of the source signals Vd are adjusted such that the middle-voltages Vd-center of the source signals Vd corresponding to gray levels are within the shadow of FIG. 4E. Thus, the optimized common signal voltages Vcom-opt are located within the shadow of FIG. 4F. When the brightness or the gray level is lower than the preset value $Ln_1$, the optimized common signal voltage Vcom-opt is between the voltages of curves L'2 and L'3 (as represented by shadow A in FIG. 4F). When the brightness or the gray level is higher than the preset value $Ln_1$, the optimized common signal voltage Vcom-opt is between the voltages of curves L'3 and L'1 (as represented by shadow B in FIG. 4F). When the brightness or the gray level is lower than the preset value $Ln_1$, the optimized common signal voltage Vcom-opt is set to be higher than the predetermined voltage $V_{COM}$ of the curve L'2 and the absolute voltage difference between the optimized common signal voltage Vcom-opt and the predetermined voltage $V_{COM}$ of the curve L'2 is less than or equal to that between the curves L'2 and L'1. When the brightness or the gray level is not lower than the preset value $Ln_1$, the absolute voltage difference between the optimized common signal voltage Vcom-opt and the predetermined voltage $V_{COM}$ of the curve L'2 is set to be lower than or equal to that between the curves L'2 and L'1.

According to one embodiment of the present invention, when the brightness or the gray level is not lower than the preset value $Ln_1$ (e.g., the gray level of the preset value $Ln_1$ is 128; the gray level is higher as the brightness is brighter), an interlacing method is utilized such that the optimized common signal voltage Vcom-opt is higher or lower than the predetermined voltage $V_{COM}$ of the common signal in any eight neighboring gray levels. Taking 256 gray levels as an example, a first group comprises eight gray levels, such as 136 to 143, and a second group comprises eight gray levels, such as 144 to 151. In the first group, the optimized common signal voltage Vcom-opt can be set to be higher (or lower) than the predetermined voltage $V_{COM}$ of the common signal. In the second group neighboring the first group, the optimized common signal voltage Vcom-opt can be set to be lower (or higher) than the predetermined voltage of the common signal. When dynamic images are displayed for a long time, an inter-electric field occurring due to the image sticking issue is removed so as to reduce image sticking itself.

When the method for driving the LCD is applied in an uncompensated LCD suffering from the image sticking or poor liquid crystal material, the image sticking can be significantly improved. The image sticking includes a surface type sticking and a line shape sticking. The present invention reduces the line shape sticking and improves surface type sticking. Generally, when image sticking is generated, the image sticking exists in the LCD and can not be removed. If the method of the invention is utilized for a long time, the surface type sticking in some LCDs can be improved or completely eliminated.

In the previous embodiment, the LCD is a normal black type. In the following embodiment, the LCD is a normal white type described with reference to FIGS. 4G and 4H.

Figure 4G:
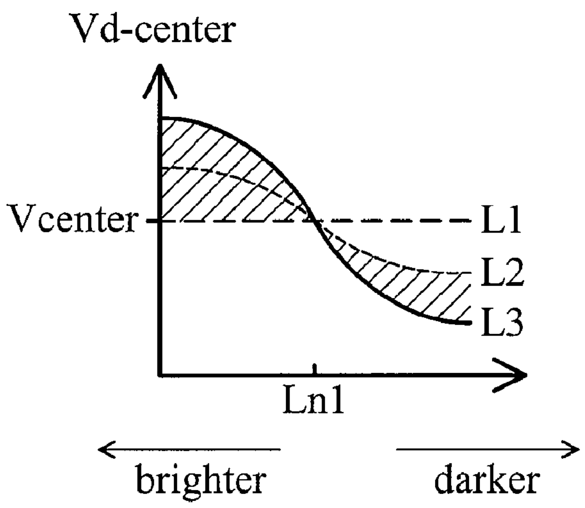
Figure 4H:
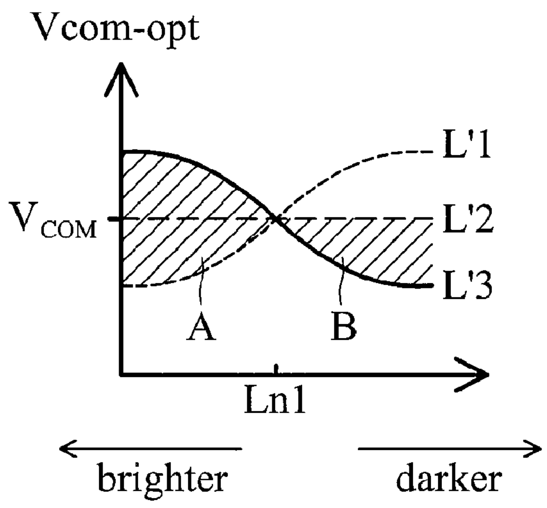

In FIGS. 4A to 4F, the x-axis is horizontal with gray levels increasing from left to right. In FIGS. 4G and 4H, the x-axis is horizontal with gray levels reducing from left to right. The curve L'3 shown in FIG. 4H is generated according to the curves L'1 and L'2. The Vcom-opt curve L'3 is a mirror curve of the curve L'1 with respect to the curve L'2. Thus, the voltage difference between curves L'3 and L'2 is equal to that between curves L'1 and L'2 in a gray level. When the gray level exceeds the preset value $Ln_1$ (the brightness of the gray level is brighter than that of the preset value $Ln_1$), the voltage of the curve L'1 is less than the predetermined voltage $V_{COM}$ of the curve L'2 and the voltage of the curve L'3 exceeds that of the curve L'2.

Similarly, according to another embodiment of the present invention, when the brightness or the gray level is not lower than the preset value $Ln_1$ (e.g., the gray level of the preset value $Ln_1$ is 128; the gray level is higher as the brightness is lower), an interlacing method is utilized such that the optimized common signal voltage Vcom-opt is higher or lower than the predetermined voltage $V_{COM}$ of the common signal, in any eight neighboring gray levels. Taking 256 gray levels as an example, a first group comprises eight gray levels, such as 16 to 23, and a second group comprises eight gray levels, such as 24 to 31. In the first group, the optimized common signal voltage Vcom-opt can be set to be higher (or lower) than the predetermined voltage $V_{COM}$ of the common signal. In the second group neighboring the first group, the optimized common signal voltage Vcom-opt can be set to be lower (or higher) than the predetermined voltage of the common signal.

According to the present invention, the voltages of the source signals Vd are adjusted such that the middle-voltages Vd-center of the source signals Vd corresponding to gray levels are within the shadow of FIG. 4G. Thus, the optimized common signal voltages Vcom-opt are located within the shadow of FIG. 4H. If the voltages of the source signals Vd are adjusted and the gray level is less than the preset value $Ln_1$ (the brightness of the gray level is darker than that of the preset value $Ln_1$), the optimized common signal voltage Vcom-opt is set. Thus, the optimized common signal voltage Vcom-opt is between the voltages of curves L'2 and L'3 (shadow B in FIG. 4H). When the gray level is higher than the preset value $Ln_1$ (the brightness of the gray level is brighter than that of the preset value $Ln_1$), the optimized common signal voltage Vcom-opt is set. Thus, the optimized common signal voltage Vcom-opt is between the voltages of curves L'3 and L'1 (shadow A in FIG. 4H). In other words, when the brightness is less than the preset value $Ln_1$, the optimized common signal voltage Vcom-opt is set to be less than the predetermined voltage $V_{COM}$ of the curve L'2, and the absolute voltage difference between the optimized common signal voltage Vcom-opt and the predetermined voltage $V_{COM}$ of the curve L'2 is less than or equal to the absolute voltage difference between the curves L'2 and L'1.

When the brightness or the gray level is not lower than the preset value $Ln_1$, the absolute voltage difference between the optimized common signal voltage Vcom-opt and the predetermined voltage $V_{COM}$ of the curve L'2 is less than or equal to the absolute voltage difference between the curves L'2 and L'1.

The method for driving an LCD is easily implemented in a driving circuit of the LCD. Thus, the image sticking issue in the LCD can be improved or eliminated.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A method for driving a liquid crystal display (LCD) comprising a liquid crystal layer, a thin film transistor (TFT) comprising a source for receiving a source signal, a pixel electrode coupled to a drain of the TFT, and a counter electrode for receiving a common signal with a predetermined voltage, wherein a brightness of the LCD is brighter when a voltage difference between the pixel electrode and the counter electrode is higher, the method comprising:

driving the LCD by applying uncompensated source signals corresponding to gray levels;

recording first optimized common signal voltages of a plurality of common signals corresponding to the gray levels; and adjusting the source signal to drive the LCD such that second optimized common signal voltages of the common signals corresponding to the gray levels conform to either of the following conditions:

(1) when the gray level is lower than a predetermined gray level, the second optimized common signal voltage is higher than the predetermined voltage of the common signal, and the absolute difference between the second optimized common signal voltage and the predetermined voltage is less than or equal to that between the first optimized common signal voltage and the predetermined voltage; and (2) when the gray level is not lower than the predetermined gray level, the absolute difference between the second optimized common signal voltage and the predetermined voltage is less than or equal to that between the first optimized common signal voltage and the predetermined voltage.

2. The method as claimed in claim 1, wherein when the gray level is not lower than the predetermined gray level, the second optimized common signal voltages of the common signals corresponding to the gray levels conform to the following condition: in a first group comprising eight gray levels, the second optimized common signal voltage is higher than the predetermined voltage of the common signal, and in a second group comprising another eight gray levels and neighboring the first group, the second optimized common signal voltage is lower than the predetermined voltage of the common signal.

3. A method for driving a liquid crystal display (LCD) comprising a liquid crystal layer, a thin film transistor (TFT) comprising a source for receiving a source signal, a pixel electrode coupled to a drain of the TFT, and a counter electrode for receiving a common signal with a predetermined voltage, wherein a brightness of the LCD is darker when a voltage difference between the pixel electrode and the counter electrode is higher, the method comprising:

driving the LCD by applying uncompensated source signals corresponding to gray levels;

recording first optimized common signal voltages of a plurality of common signals corresponding to the gray levels; and adjusting the source signal to drive the LCD such that second optimized common signal voltages of the common signals corresponding to the gray levels conform to either of the following conditions:

(1) when the gray level is lower than a predetermined gray level, the second optimized common signal voltage is lower than the predetermined voltage of the common signal, and the absolute difference between the second optimized common signal voltage and the predetermined voltage is less than or equal to that between the first optimized common signal voltage and the predetermined voltage; and (2) when the gray level is not lower than the predetermined gray level, the absolute difference between the second optimized common signal voltage and the predetermined voltage is less than or equal to that between the first optimized common signal voltage and the predetermined voltage.

4. The method as claimed in claim 3, wherein when the gray level is not lower than the predetermined gray level, the second optimized common signal voltages of the common signals corresponding to the gray levels conform to the following condition: in a first group comprising eight gray levels, the second optimized common signal voltage is higher than the predetermined voltage of the common signal, and in a second group comprising another eight gray levels and neighboring the first group, the second optimized common signal voltage is lower than the predetermined voltage of the common signal.

5. A method for driving a liquid crystal display, comprising:

providing a liquid crystal display (LCD) comprising a liquid crystal layer, a plurality of thin film transistors (TFT), a plurality of pixel electrodes, and a counter electrode for receiving a common signal with a predetermined voltage, wherein each TFT comprises a source for receiving a source signal and a drain coupled to the corresponding pixel electrode, a brightness of the LCD is brighter when a voltage difference between the pixel electrode and the counter electrode is higher, and the LCD comprises first optimized common signal voltages of the common signal by applying uncompensated source signals corresponding to gray levels;

applying compensated source signals to drive the LCD such that second optimized common signal voltages of the common signal corresponding to the gray levels conform to either of the following conditions:

(1) when the gray level is lower than a predetermined gray level, the second optimized common signal voltage is higher than the predetermined voltage of the common signal, and the absolute difference between the second optimized common signal voltage and the predetermined voltage is less than or equal to that between the first optimized common signal voltage and the predetermined voltage; and (2) when the gray level is not lower than the predetermined gray level, the absolute difference between the second optimized common signal voltage and the predetermined voltage is less than or equal to that between the first optimized common signal voltage and the predetermined voltage.

6. The method as claimed in claim 5, wherein when the gray level is not lower than the predetermined gray level, the second optimized common signal voltages of the common signal corresponding to the gray levels conform to the following condition: in a first group comprising eight gray levels, the second optimized common signal voltage is higher than the predetermined voltage of the common signal, and in a second group comprising another eight gray levels and neighboring the first group, the second optimized common signal voltage is lower than the predetermined voltage of the common signal.

7. A method for driving a liquid crystal display, comprising:

providing a liquid crystal display (LCD) comprising a liquid crystal layer, a plurality of thin film transistors (TFT), a plurality of pixel electrodes, and a counter electrode for receiving a common signal with a predetermined voltage, wherein each TFT comprises a source for receiving a source signal and a drain coupled to the corresponding pixel electrode, a brightness of the LCD is darker when a voltage difference between the pixel electrode and the counter electrode is higher, and the LCD comprises first optimized common signal voltages of the common signal by applying uncompensated source signals corresponding to gray levels;

applying compensated source signals to drive the LCD such that second optimized common signal voltages of the common signal corresponding to the gray levels conform to either of the following conditions:

(1) when the gray level is lower than a predetermined gray level, the second optimized common signal voltage is lower than the predetermined voltage of the common signal, and the absolute difference between the second optimized common signal voltage and the predetermined voltage is less than or equal to that between the first optimized common signal voltage and the predetermined voltage; and (2) when the gray level is not lower than the predetermined gray level, the absolute difference between the second optimized common signal voltage and the predetermined voltage is less than or equal to that between the first optimized common signal voltage and the predetermined voltage.

8. The method as claimed in claim 7, wherein when the gray level is not lower than the predetermined gray level, the second optimized common signal voltages of the common signals corresponding to the gray levels conform to the following condition: in a first group comprising eight gray levels, the second optimized common signal voltage is higher than the predetermined voltage of the common signal, and in a second group comprising another eight gray levels and neighboring the first group, the second optimized common signal voltage is lower than the predetermined voltage of the common signal.

* * * * *